(12) United States Patent
Khosroshahi et al.

(10) Patent No.: US 12,051,527 B2
(45) Date of Patent: Jul. 30, 2024

(54) ABRASION RESISTANT TEXTILE SLEEVE, IMPROVED MULTIFILAMENT YARN THEREFOR AND METHODS OF CONSTRUCTION THEREOF

(71) Applicant: Federal-Mogul Powertrain, LLC, Southfield, MI (US)

(72) Inventors: Ali Khosroshahi, Malvern, PA (US); Tianqi Gao, Exton, PA (US); Leigh Krauser, Coatesville, PA (US); Yi Li, Philadelphia, PA (US); Ritesh Mehbubani, Royersford, PA (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 504 days.

(21) Appl. No.: 15/409,150

(22) Filed: Jan. 18, 2017

(65) Prior Publication Data
US 2017/0207005 A1 Jul. 20, 2017

Related U.S. Application Data

(60) Provisional application No. 62/280,923, filed on Jan. 20, 2016.

(51) Int. Cl.
*H01B 7/18* (2006.01)
*D03D 1/00* (2006.01)
(Continued)

(52) U.S. Cl.
CPC .............. *H01B 7/18* (2013.01); *D03D 1/0041* (2013.01); *D03D 15/567* (2021.01); *D04C 1/02* (2013.01);
(Continued)

(58) Field of Classification Search
CPC .... D03D 15/04; D03D 1/0041; D03D 1/0043; D03D 15/567; D03D 15/587;
(Continued)

(56) References Cited

U.S. PATENT DOCUMENTS 2,777,310 A * 1/1957 Comer ................ D02G 3/24
66/180
2,890,567 A * 6/1959 Taylor ................ D02G 1/0286
57/239
(Continued)

FOREIGN PATENT DOCUMENTS

| CN | 101722599 A | 7/2010 |
| CN | 101772599 A | 7/2010 |

(Continued)

OTHER PUBLICATIONS

Typical Engineering Properties of Polypropylene, Apr. 2014, INEOS Olefins & Polymers USA, pp. 1-2 (Year: 2014).*

(Continued)

*Primary Examiner* — Lee E Sanderson
*Assistant Examiner* — Thomas J Kessler
(74) *Attorney, Agent, or Firm* — Robert L. Stearns; Dickinson Wright PLLC

(57) ABSTRACT

A textile sleeve for routing and protecting an elongate member against abrasion and method of construction thereof are provided. The sleeve includes a flexible wall having a plurality of yarns interlaced with one another. At least some of the plurality of yarns are provided as improved multifilament yarns having low-melt filaments and non-low-melt filaments. The low-melt filaments have a first melt temperature and the non-low-melt filaments having a second melt temperature, with the second melt temperature being greater than the first melt temperature. The low-melt filaments are (Continued)

bonded with the non-low-melt filaments to prevent relative sliding movement therebetween.

17 Claims, 4 Drawing Sheets

(51) Int. Cl.
    *D03D 15/567*    (2021.01)
    *D04C 1/02*      (2006.01)
    *D04C 1/12*      (2006.01)
    *D06N 7/00*      (2006.01)
    *H01B 17/58*     (2006.01)
    *H02G 3/04*      (2006.01)

(52) U.S. Cl.
    CPC ............... *D04C 1/12* (2013.01); *D06N 7/00* (2013.01); *H01B 17/58* (2013.01); *H02G 3/04* (2013.01); *H02G 3/0481* (2013.01); *D06N 2209/105* (2013.01); *D10B 2401/041* (2013.01)

(58) Field of Classification Search
    CPC .. D06N 2209/105; D06N 7/00; G02B 6/4432; H01B 17/58; H01B 7/18; H02G 3/04; H02G 3/0481; D04C 1/02; D04C 1/12; D10B 2401/041; D10B 2505/12; Y10T 428/249938
    USPC ..... 428/35.5, 36.1, 36.2, 36.3, 36.4; 57/244, 57/245
    See application file for complete search history.

(56) References Cited

U.S. PATENT DOCUMENTS

| | | | |
|---|---|---|---|
| 4,299,884 A * | 11/1981 | Payen | D02G 3/385 428/377 |
| 6,003,565 A * | 12/1999 | Whittier, II | D03D 15/00 139/420 A |
| 8,118,967 B2 | 2/2012 | Sinykin | |
| 8,182,645 B2 | 5/2012 | Sinykin | |
| 8,298,364 B2 | 10/2012 | Sinykin | |
| 9,404,202 B2 * | 8/2016 | Lawrence | D02G 3/04 |
| 2004/0084203 A1 * | 5/2004 | Gladfelter | G02B 6/4463 174/93 |
| 2005/0124249 A1 | 6/2005 | Uribarri | |
| 2009/0218002 A1 * | 9/2009 | Kashihara | D03D 1/0041 139/433 |
| 2013/0243985 A1 | 9/2013 | Furuta et al. | |
| 2014/0090739 A1 * | 4/2014 | Harris | D03D 15/49 139/35 |
| 2014/0220276 A1 * | 8/2014 | Gao | D04C 1/06 428/36.1 |
| 2014/0272218 A1 | 9/2014 | Thomas et al. | |
| 2016/0021799 A1 * | 1/2016 | Harris | D04C 1/02 87/9 |
| 2016/0024697 A1 | 1/2016 | Cabouillet et al. | |

FOREIGN PATENT DOCUMENTS

| | | |
|---|---|---|
| CN | 102007239 A | 4/2011 |
| CN | 103210128 A | 7/2013 |
| DE | 102007023062 A1 | 11/2008 |
| EP | 2647749 A1 | 10/2013 |
| JP | 2007514068 A | 5/2007 |
| JP | 5790652 B2 | 10/2015 |
| JP | 2016091689 A | 5/2016 |
| WO | 2014034799 A1 | 3/2014 |
| WO | 2014158694 A | 10/2014 |
| WO | 2016010730 A1 | 1/2016 |

OTHER PUBLICATIONS

Carbon Fiber, 2022, American Elements (Year: 2022).*
International Search Report, mailed May 4, 2017 (PCT/US2017/014041).

* cited by examiner

ABRASION RESISTANT TEXTILE SLEEVE, IMPROVED MULTIFILAMENT YARN THEREFOR AND METHODS OF CONSTRUCTION THEREOF

CROSS-REFERENCE TO RELATED APPLICATION

This application claims the benefit of U.S. Provisional Application Ser. No. 62/280,923, filed Jan. 20, 2016, which is incorporated herein by reference in its entirety.

BACKGROUND OF THE INVENTION

1. Technical Field

This invention relates generally to textile sleeves for protecting elongate members, and more particularly to abrasion resistant, flexible textile sleeves and to methods of construction thereof.

2. Related Art

It is known to wrap elongate members in protective sleeves to provide protection to elongate members contained therein against abrasion and contamination. Unfortunately, although known sleeves can be effective at providing such protection to elongate members against abrasion and contamination, they typically have a relative high fabric density, due to the need for increased amounts of yarn material to provide the desired protection against both abrasion and contamination, thereby adding cost, bulk, stiffness and weight to the sleeve.

SUMMARY OF THE INVENTION

One aspect of the invention provides an abrasion resistant, flexible textile sleeve for routing and protecting an elongate member contained therein from exposure to abrasion. The sleeve has a wall extending lengthwise along a longitudinal axis between opposite ends, wherein the wall is configured to bound a cavity, in which the elongate member is contained and protected. The wall is constructed, at least in part, from improved multifilament yarn, which enhances the abrasion resistance of the sleeve wall, while also allowing the fabric density of the wall to remain relatively low, given the degree of abrasion resistance provided, thereby reducing cost, weight and the outer envelope of the sleeve, while also enhancing the flexibility of the sleeve. The improved multifilament yarn includes a plurality of fibers and/or filaments, referred to hereafter for convenience as filaments (being distinguishable by length, with filaments being much longer than fibers, and can extend the entire length of the yarn as continuous, unbroken members, in contrast to much shorter fibers), with at least some of the filaments being provided as "low-melt" filaments and with at least some of the filaments being provided as "standard," "non-low-melt" filaments. By "low-melt" it will be recognized by one skilled in the art that the low-melt fibers melt, at least in part, at a lower temperature as compared to the standard melt temperature fibers, if the standard filaments are capable of melting at all. As such, during production of the sleeve, upon forming the textile, interlaced wall of the sleeve, the wall is subjected to a predetermined heat treatment process, whereupon the low-melt filaments are caused to melt, at least in part, while the standard melt temperature filaments remain entirely or substantially unmelted. The at least partially melted low-melt filaments act as glue to bond all the filaments, including the standard, non-low-melt temperature filaments, of the multifilament yarn to one another. Accordingly, the individual filaments are prevented or inhibited from moving in sliding relation relative to one another, which in turn reduces the abrasion between the individual filaments of the multifilament yarn, thus improving the resistance of the sleeve wall to wear from abrasion. However, although the melted filaments are bonded to one another, the filaments, and wall formed thereby, remain highly flexible, thereby allowing the resulting sleeve to be routed about meandering paths and corners. As such, with the sleeve wall remaining substantially un-abraded in use, the elongate members contained therein are optimally protected against external sources of abrasion and contamination.

In accordance with another aspect of the invention, the textile sleeve may be constructed as a woven, knit or braided sleeve.

In accordance with another aspect of the invention, the textile sleeve may be constructed having a circumferentially closed, tubular and seamless wall.

In accordance with another aspect of the invention, the textile sleeve may be constructed having a circumferentially open wall, having opposite edges extending lengthwise between the opposite ends, wherein the opposite edges are configured to be brought into overlapping relation with one another.

In accordance with another aspect of the invention, the opposite edges can be biased into overlapping relation with one another via heat-set, circumferentially extending yarn.

In accordance with another aspect of the invention, the improved multifilament yarn includes about 1%-90% low-melt filament content.

In accordance with another aspect of the invention, the improved multifilament yarn can have a denier ranging between about 150-20000, as a single or multiply yarn.

In accordance with another aspect of the invention, the improved multifilament yarn can include at least one or a plurality heat-settable filaments.

In accordance with another aspect of the invention, the improved multifilament yarn can include a plurality of low-melt filaments and a plurality of standard melt filaments, wherein the individual filaments can be combed with one another to extending substantially parallel with one another.

In accordance with another aspect of the invention, the improved multifilament yarn can include at least one low-melt filament and at least one standard melt filament twisted with one another.

In accordance with another aspect of the invention, the improved multifilament yarn can include a plurality of low-melt filaments and a plurality of standard melt filaments braided with one another.

In accordance with another aspect of the invention, the improved multifilament yarn can include a plurality of low-melt filaments and a plurality of standard melt filaments air-texturized with one another.

In accordance with another aspect of the invention, the improved multifilament yarn can include a plurality of low-melt filaments and a plurality of standard melt filaments twisted and texturized with one another.

In accordance with another aspect of the invention, a method of constructing an abrasion resistant textile sleeve for routing and protecting an elongate member contained therein from exposure to abrasion and contamination is provided. The method includes forming a textile wall extending lengthwise along a longitudinal axis between opposite ends at least in part from improved multifilament yarn, formed in accordance with one aspect of the invention. The improved multifilament yarn is provided including a plurality of filaments, with at least some of the filaments being provided as "low-melt" filaments and with at least some of the filaments being provided as "standard" melt temperature filaments, if they melt at all. Then, upon forming the textile wall of the sleeve, the method includes heat-treating the sleeve and causing the low-melt filaments to melt, at least in part, while avoiding or substantially avoiding melting the standard melt temperature filaments, thereby causing all the filaments within the improved multifilament yarn to be bonded to one another via the at least partially melted low-melt filaments.

In accordance with another aspect of the invention, the method of constructing the sleeve includes weaving, knitting or braiding the wall of the sleeve.

In accordance with another aspect of the invention, the method of constructing the sleeve can include forming the wall as a circumferentially continuous, closed, tubular and seamless wall.

In accordance with another aspect of the invention, the method of constructing the sleeve can include forming the wall as a circumferentially open wall, having opposite edges extending lengthwise between the opposite ends, wherein the opposite edges are configured to be brought into overlapping relation with one another.

In accordance with another aspect of the invention, the method of constructing the sleeve can include biasing the opposite edges into overlapping relation with one another via heat-setting circumferentially extending yarn during the heat-treating process used to melt the low-melt filaments.

In accordance with another aspect of the invention, the method of constructing the sleeve can include heat-setting at least one or a plurality of heat-settable yarns contained within the improved multifilament yarn.

In accordance with another aspect of the invention, the method of constructing the sleeve can include providing the improved multifilament yarn having a denier ranging between about 150-20000, as a single or multiply yarn.

In accordance with another aspect of the invention, the method of constructing the sleeve can include providing the improved multifilament yarn including a plurality of low-melt filaments and a plurality of standard melt filaments, wherein the individual filaments can be combed with one another to extending substantially parallel with one another.

In accordance with another aspect of the invention, the method of constructing the sleeve can include providing the improved multifilament yarn including at least one low-melt filament and at least one standard melt filament twisted with one another.

In accordance with another aspect of the invention, the method of constructing the sleeve can include providing the improved multifilament yarn including a plurality of low-melt filaments and a plurality of standard melt filaments braided with one another.

In accordance with another aspect of the invention, the method of constructing the sleeve can include providing the improved multifilament yarn including a plurality of low-melt filaments and a plurality of standard melt filaments air-texturized and intermingled with one another.

In accordance with another aspect of the invention, the method of constructing the sleeve can include providing the improved multifilament yarn including a plurality of low-melt filaments and a plurality of standard melt filaments twisted and texturized with one another.

In accordance with another aspect of the invention, a method of constructing an improved multifilament yarn is provided. The method includes forming the multifilament yarn with a plurality of filaments, with at least some of the filaments being provided as "low-melt" filaments and with at least some of the filaments being provided as "standard" melt temperature filaments, if meltable at all. The low-melt filaments are provided to melt at least in part at a first temperature, and the standard melt temperature filaments are provided with a second melt temperature, if at all, wherein the first temperature is lower than the second temperature.

In accordance with another aspect of the invention, the method of constructing the improved multifilament yarn includes providing the low-melt filaments content to be between about 1-90 wt %.

In accordance with another aspect of the invention, the method of constructing the improved multifilament yarn includes forming the improved multifilament having a denier ranging between about 150-20000, as a single or multiply yarn.

In accordance with another aspect of the invention, the method of constructing the improved multifilament yarn includes combining a pre-existing multifilament comprising entirely or substantially standard melt temperature filaments with a pre-existing multifilament comprising entirely or substantially low-melt temperature filaments.

In accordance with another aspect of the invention, the method of combining the pre-existing multifilament of standard melt temperature filaments with the pre-existing multifilament of low-melt temperature filaments can include an intermingling, twisting, texturizing, serving, cabling or similar process.

In accordance with another aspect of the invention, the method of constructing the improved multifilament yarn can include combing at least one heat-settable filament with the low-melt filaments and the standard melt filaments.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1A:
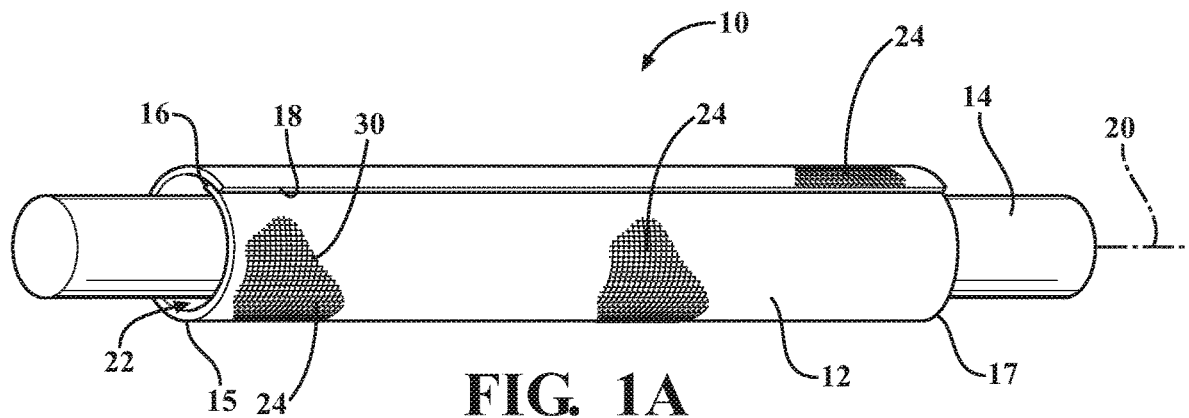
FIGS. 1A-1C are schematic perspective views of textile sleeves constructed in accordance with various aspects of the invention shown carrying and protecting an elongate member therein.
Figure 1B:
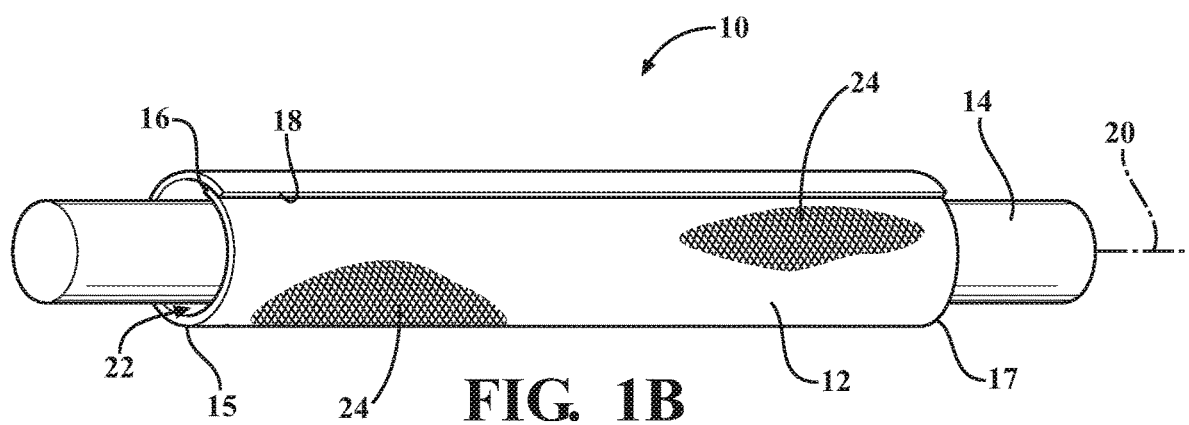
Figure 1C:
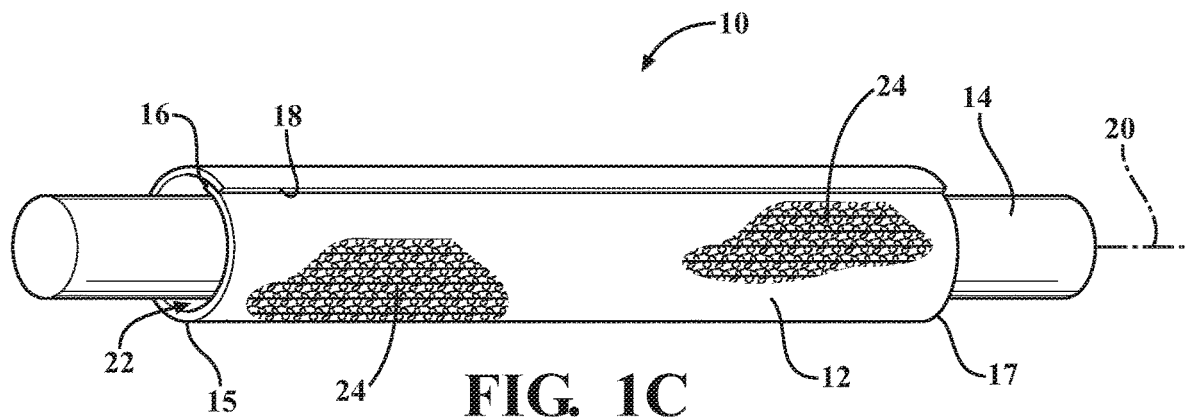

Referring in more detail to the drawings, FIGS. 1A-1C show schematic representations of textile sleeves, referred to hereafter as sleeve 10, constructed in accordance with various aspects of the invention. The sleeve 10 is shown having a wrappable elongate wall 12 for routing and protecting an elongate member 14, such as wires, a wire harness, or tube, for example, from exposure to abrasion and the ingress of contamination, debris and the like. The elongate wall 12 has opposite edges 16, 18 extending lengthwise along a longitudinal, central axis 20 between opposite ends 15, 17, wherein the edges 16, 18 are configured to be wrapped into overlapping relation with one another in "cigarette wrapped" fashion to fully enclose the elongate member 14 within a central cavity 22 of the sleeve 10. The cavity 22 is readily accessible along the full length of the central axis 20 so that the elongate member 14 can be readily disposed radially into the cavity 22, and conversely, removed from the cavity 22, such as during service. The opposite edges 16, 18 can be biased into overlapping relation with one another via heat-set, circumferentially extending yarn, if desired. To provide protection to the elongate member 14 against abrasion and contamination, and to enhance the ability of the wall 12 to resist being abraded, the wall 12 is constructed, at least in part, with improved multifilament yarn 24 (FIGS. 3A-3F show various versions, though it is to be understood the appearance can be different depending on the mechanism used to form the yarn 24, e.g. intermingling, twisting, texturizing, serving, cabling or similar process), via one of a weaving (FIG. 1A), braiding (FIG. 1B) or knitting (FIG. 1C) process.

Depending on the application needs, the wall 12 can be constructed having any suitable size, including length, width and diameter. If the wall 12 is heat-set and brought into a self-wrapped tubular configuration, generally free from any externally applied forces, the edges 16, 18 preferably overlap one another at least slightly to fully enclose the cavity 22, and thus, provide enhanced protection to the elongate member 14 contained in the cavity 22. The lengthwise edges 16, 18 are readily extendable away from one another under an externally applied force sufficient to overcome the bias imparted by the heat-set yarn, such as heat-settable monofilaments 30 of polymeric material monofilament, such as polyphenylene sulfide (PPS) or polyethyleneterephthalate (PET), for example, to at least partially open and expose the cavity 22. Accordingly, the elongate member 14 can be readily disposed into the cavity 22 during assembly or removed from the cavity 22 during service. Upon releasing the externally applied force, the edges 16, 18 return automatically to their overlapping, self-wrapped position under the bias imparted by the heat-set fill monofilament yarns 30.

The improved multifilament yarn 24 includes a plurality of filaments, with at least some of the filaments being provided as "low-melt" filaments 26 and with at least some of the filaments being provided as "standard" melt temperature filaments 28. By "low-melt" it will be recognized by one skilled in the art that the low-melt filaments 26 melt, at least in part, at a lower temperature, such as between about 100-200° C., by way of example and without limitation, as compared to the standard melt temperature filaments 28, such as between about 260-280° C., by way of example and without limitation, if at all. As such, upon forming the textile wall 12 of the sleeve 10, the sleeve 10 can be heat-treated at a temperature sufficient to at least partially melt the low-melt filaments 26, but low enough to avoid melting the standard filaments 28, whereupon the at least partially melted low-melt filaments 26 act as glue to bond all the filaments, including the standard melt temperature filaments 28, of the improved multifilament 24 to one another. Accordingly, the individual filaments 26, 28 are prevented or inhibited from moving relative to one another, which in turn reduces the friction and abrasion between the individual filaments 26, 28 of the improved multifilament 24, thus improving the resistance of the sleeve wall 12 to abrasion, and preventing the individual filaments 26, 28 from being separated and penetrated or otherwise broken by an external abradant source.

Further, with the standard filaments 28 remaining unmelted, they retain their full tenacity and functionality, thereby further enhancing the protective shielding coverage and abrasion resistance of the wall 12, while minimizing the amount of yarn material needed to provide the desired protection, thus, minimizing the bulk, weight and outer envelope of the sleeve 10. Some non-limiting examples of types of low-melt filaments 26 and standard filaments 28 include, respectively; low-melt/polyethylene terephthalate (PET); polypropylene (PP)/PET; low-melt/Nomex®; PP/Nomex®; PET/Nomex®; low-melt/fiberglass; PP/fiberglass; polyethylene (PE)/fiberglass, by way of example and without limitation. The low-melt material can be any desired low-melt polymeric material, including a homopolymer, such as polypropylene, polyethylene, etc., or a copolymer, such as copolyester, copolyamide, in the form of a multifilament yarn or mono-component containing or bicomponent containing multifilament yarn. Some additional standard filaments 28 may include thermoset fibers, mineral fibers, or metallic yarn, and acrylic fibers, cotton fibers, rayon fibers, and fire retardant (FR) versions of all the aforementioned fiber materials, by way of example and without limitation. It should be recognized that the heat-treating process could be used to heat-set the heat-settable, circumferentially extending yarn of monofilaments 30, if desired, thereby performing multiple functions in a single heat-treating, heat-setting process.

In one exemplary sleeve embodiment, the improved multifilament yarns 24 were provided as warp yarns in the wrappable sleeve 10 of FIG. 1, having a denier of about 1250. The improved multifilament yarns 24 were formed from low-melt multifilament filaments 26 having a denier of about 150 combined with standard multifilament filaments 28 having a denier of about 1100, whereupon combining the two multifilament yarns 26, 28, the resulting improved multifilament yarn 24 has a substantially uniform, homogenous cross-sectional content of the different materials of the two different multifilament yarns 26, 28. The sleeve 10 was further constructed having a warp density between about 20-30 end/inch, while the weft density was between about 15-25 picks/inch from monofilaments 30 of about 0.22 mm diameter PET, by way of example and without limitation. Then, upon forming the wall 12, the wall 12 was wrapped to bring the opposite edges 16, 18 into overlapping relation with one another and heat-treated in a single heating process, at a suitable temperature, to both heat-set the weft monofilaments 30, thereby maintaining the wall 12 in its wrapped configuration, and also melt the low-melt fibers 26 within the improved multifilament 24, thereby bonding all the filaments 26, 28 of the improved multifilament yarn 24 together via the melted material. The weave used to form the wall can be any desired weave pattern, such as a plain weave pattern; however, other weave patterns are contemplated herein, such as twill, basket, satin or sateen, by way of example.

Figure 2A:
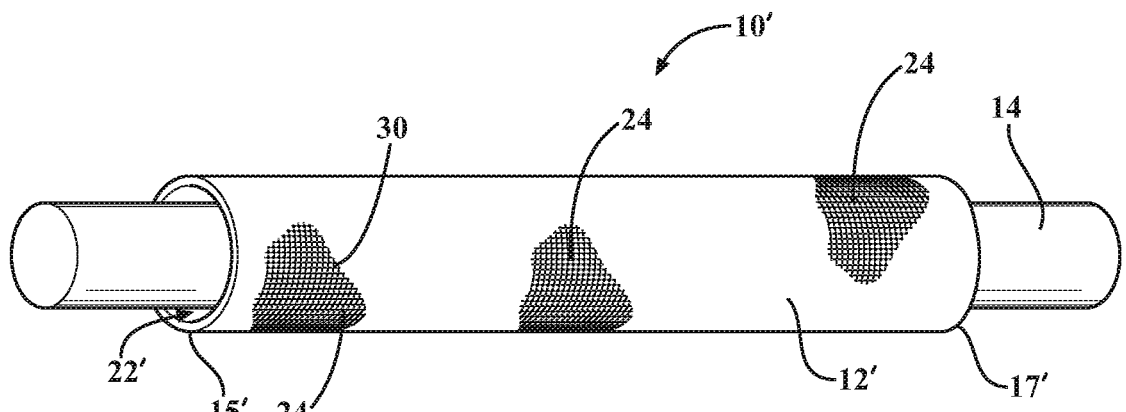
FIGS. 2A-2C are schematic perspective views of textile sleeves constructed in accordance additional aspects of the invention shown carrying and protecting an elongate member therein.
Figure 2B:
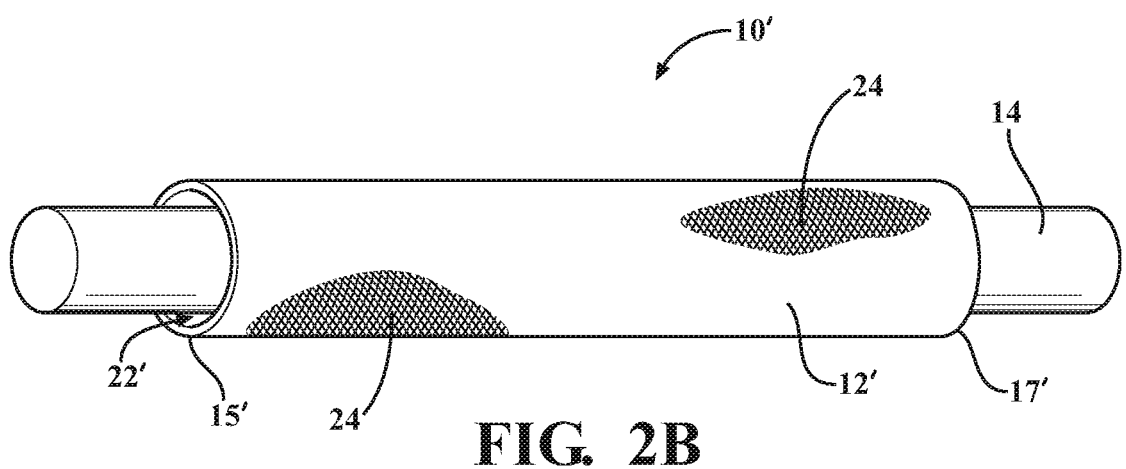
Figure 2C:
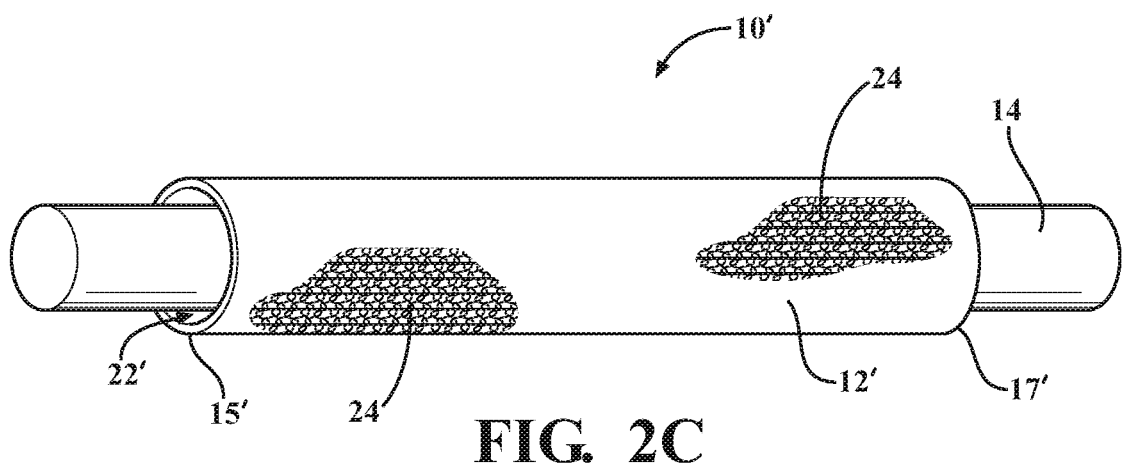
Figure 3A:
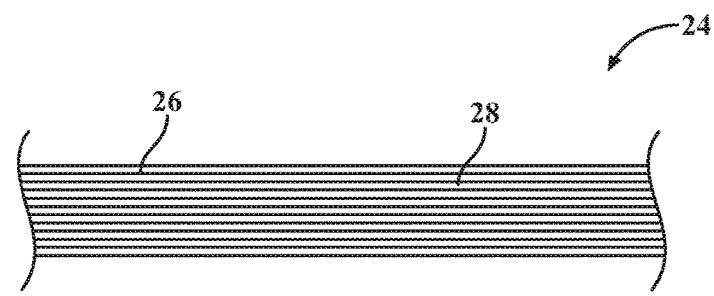
FIGS. 3A-3F are an enlarged partial schematic views of improved multifilament yarns used, at least in part, to construct the sleeves of FIGS. 1A-1C and 2A-2C.
Figure 3B:
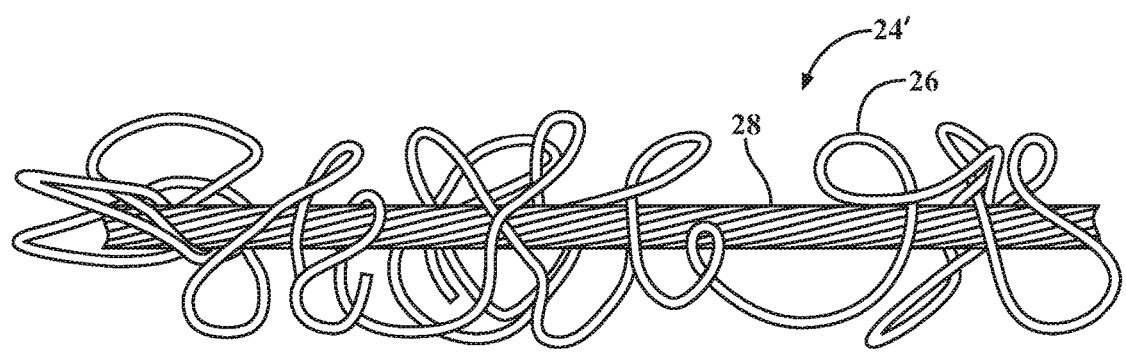
Figure 3C:
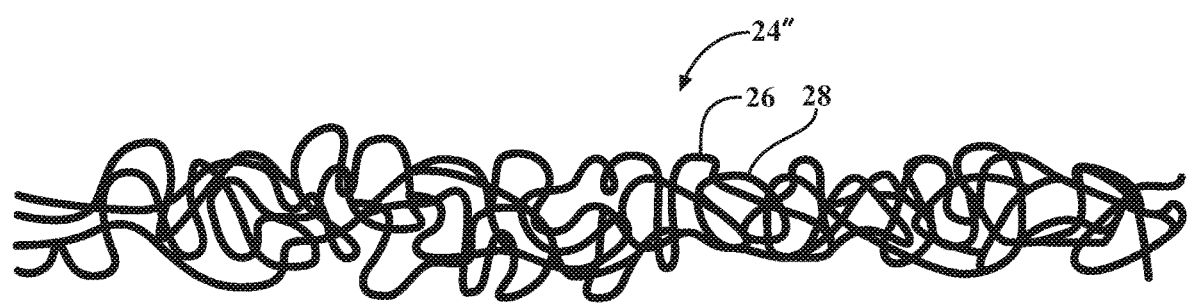
Figure 3D:
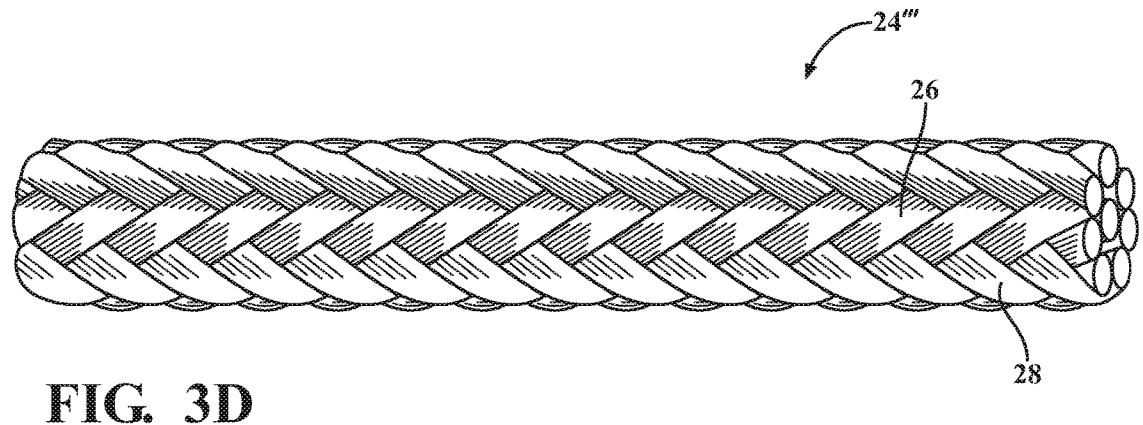
Figure 3E:
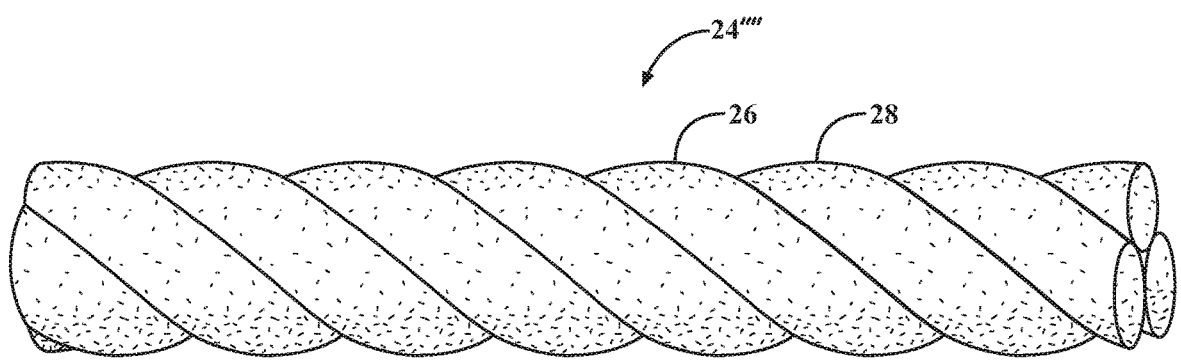
Figure 3F:
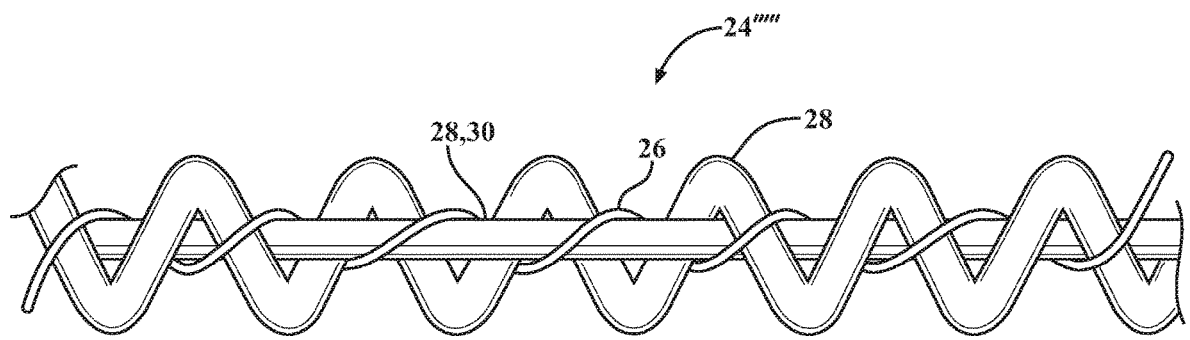

In FIGS. 2A-2C, textile sleeves 10' constructed in accordance with additional aspects of the invention are shown, wherein the same reference numerals as used above with regard to the sleeve 10, differentiated by a prime symbol ('), are used to identify like features. The sleeve 10' is similar to the sleeve 10; however, rather than having an open wall, the wall 12' of the sleeve 10' is circumferentially continuous and seamless, sometimes referred to as a "closed" wall bounding a central cavity 22' that extends between opposite ends 15', 17'. The sleeve 10' can be constructed using the same types of construction, i.e. weaving (FIG. 2A), braiding (FIG. 2B), knitting (FIG. 2C), as discussed above for the sleeve 10, and including the improved multifilaments 24 and optionally other yarns, as discussed above, such as the standard melt temperature multifilaments and/or monofilaments of any material type, as desired. It should be recognized that any sleeve constructed in accordance with the invention can be constructed entirely of the improved multifilament yarns 24, or a combination of the improved multifilament yarns 24 and other types of yarn, including the aforementioned standard melt temperature multifilaments and heat-settable monofilaments 30. It should further be understood that the improved multifilament yarns 24 can be used in either, or both, warp and weft directions, and as desired in one or both S and Z directions of a braided sleeve construction.

In accordance with another aspect of the invention, a method of constructing an improved multifilament yarn 24 is provided. The method includes forming the improved multifilament yarn 24 with a plurality of filaments, with at least some of the filaments being provided as "low-melt" filaments 26 and with at least some of the filaments being provided as "standard" melt temperature filaments 28, if meltable at all, meaning they could be essentially non-meltable, such as the case with mineral type yarns, for example. It should be recognized that the different types of filaments 26, 28 are separately formed filaments, and thereafter, combined with one another, via one of the various mechanisms disclosed herein, such as shown in FIGS. 3A-3E, to form the improved multifilament yarn 24. The low-melt filaments 26 are provided having a first melt temperature, and the standard melt temperature filaments 28 are provided having a second melt temperature, wherein the first melt temperature is lower than the second melt temperature, such as by about 10-1000° C., such that upon exposing the improved multifilament yarn 24 to a heat source at a temperature at about the first melt temperature, the low-melt filaments 26 at least partially melt, while the second filaments 28 remain unmelted. The low-melt filaments content of the improved multifilament yarn 24 is between about 1-90 wt %. The improved multifilament yarn 24 is formed having a denier ranging between about 150-20000, as a single or multiply yarn. The method of constructing the improved multifilament yarn 24 includes combining a pre-existing monofilament and/or multifilament comprising entirely or substantially standard melt temperature filaments 28 with a pre-existing monofilament or multifilament comprising entirely or substantially low-melt temperature filaments 26. The combining process used to combine the low-melt multifilament with the high melt multifilament to form the improved multifilament yarn 24 can include the following, wherein different embodiments of the improved multifilament yarn are identified generally by reference numeral 24, offset by respective prime symbols (', ", "', "", "''') to denote different embodiments, though it is to be recognized that any of the embodiments can be used to form a sleeve 10, 10' as discussed above: intermingling/texturizing (FIGS. 3A-3C), braiding (FIG. 3D), twisting (FIG. 3E), serving/cabling (FIG. 3F), or similar processes, by way of example and without limitation.

Many modifications and variations of the present invention are possible in light of the above teachings. It is, therefore, to be understood that the invention may be practiced otherwise than as specifically described, and that the scope of the invention is defined by claims allowed.

What is claimed is:

1. A textile sleeve for routing and protecting an elongate member against abrasion, comprising:
a flexible wall having a plurality of yarns interlaced with one another, at least some of said plurality of yarns being multifilament yarns, each one of said multifilament yarns consisting of:
a continuous low-melt filament combined with a continuous non-low-melt filament and a single continuous heat-set monofilament, said continuous low-melt filament having a first melt temperature and said continuous non-low-melt filament having a second melt temperature, said second melt temperature being greater than said first melt temperature, said continuous low-melt filament being bonded with said continuous non-low-melt filament and said single continuous heat-set monofilament to prevent relative sliding movement between said continuous low-melt filament, said continuous non-low-melt filament and said single continuous heat-set monofilament, wherein said wall has opposite edges extending generally parallel to a central axis between opposite ends, with the continuous heat-set monofilament biasing said opposite edges into overlapping relation with one another.

2. The textile sleeve of claim 1, wherein said continuous low-melt filaments and said continuous non-low-melt filaments within each of said multifilament yarns are twisted with one another.

3. The textile sleeve of claim 1, wherein said low-melt filaments and said non-low-melt filaments within each of said improved multifilament yarns are combed together to extend generally parallel with one another.

4. The textile sleeve of claim 1, wherein said low-melt filaments and said non-low-melt filaments within each of said improved multifilament yarns are intertwined with one another.

5. The textile sleeve of claim 1, wherein said low-melt filaments and said non-low-melt filaments within each of said improved multifilament yarns are braided with one another.

6. The textile sleeve of claim 1, wherein at least some of said continuous low-melt filaments and at least some of said continuous non-low-melt filaments within each of said multifilament yarns are twisted and texturized with one another.

7. The textile sleeve of claim 1, wherein at least some of said multifilament yarns have a substantially homogenous cross-sectional content of the material of said continuous low-melt filaments and said continuous non-low-melt filaments.

8. The textile sleeve of claim 1, wherein said continuous low-melt filament and said continuous non-low-melt filament are served about said single continuous heat-set monofilament.

9. The textile sleeve of claim 8, wherein said continuous low-melt filament is served about said continuous non-low-melt filament and said single continuous heat-set monofilament.

10. The textile sleeve of claim 1, wherein at least one said continuous low-melt filaments and said continuous non-low-melt filaments within each of said multifilament yarns is a continuous multifilament.

11. The textile sleeve of claim 10, wherein said continuous low-melt filaments and said continuous non-low-melt filaments within each of said multifilament yarns are continuous multifilaments.

12. A textile sleeve for routing and protecting an elongate member against abrasion, comprising:
- a flexible wall having opposite edges extending generally parallel to a central axis of the textile sleeve, said flexible wall being formed of a plurality of yarns interlaced with one another, said plurality of yarns including at least one multifilament yarn, said at least one multifilament yarn consisting of:
- a continuous low-melt multifilament having a first melt temperature, a continuous non-low-melt multifilament having a second melt temperature greater than said first melt temperature, and a single continuous heat-set monofilament twisted and/or served with one another, said single continuous heat-set monofilament biasing said opposite edges into overlapping relation with one another.

13. The textile sleeve of claim 12, wherein said continuous low-melt multifilament is served about said continuous non-low-melt multifilament and said single continuous heat-set monofilament.

14. The textile sleeve of claim 13, wherein said continuous non-low-melt multifilament is served about said continuous heat-set monofilament.

15. A multifilament yarn, consisting of:
- a low-melt multifilament having a first melt temperature;
- a non-low-melt multifilament having a second melt temperature greater than said first melt temperature; and
- a single heat-settable monofilament,
- wherein said low-melt multifilament, said non-low-melt multifilament, and said heat-settable monofilament are twisted and/or served with one another.

16. The multifilament yarn of claim 15, wherein said low-melt multifilament is served about said non-low-melt multifilament and said single heat-settable monofilament.

17. The multifilament yarn of claim 16, wherein said non-low-melt multifilament is served about said single heat-settable monofilament.

* * * * *